United States Patent
Flores (10) Patent No.: US 11,034,392 B2
(45) Date of Patent: Jun. 15, 2021

(54) APPARATUS FOR MOUNTING ON A VEHICLE AND FOR TRANSPORTING MATERIALS, EQUIPMENT, AND GEAR

(71) Applicant: Robert Flores, Clarksville, MD (US)

(72) Inventor: Robert Flores, Clarksville, MD (US)

( * ) Notice: Subject to any disclaimer, the term of this patent is extended or adjusted under 35 U.S.C. 154(b) by 0 days.

(21) Appl. No.: 16/520,171

(22) Filed: Jul. 23, 2019

(65) Prior Publication Data

US 2020/0031406 A1  Jan. 30, 2020

Related U.S. Application Data (60) Provisional application No. 62/702,409, filed on Jul. 24, 2018.

(51) Int. Cl.
*B62D 33/02* (2006.01)
*B60R 9/06* (2006.01)

(52) U.S. Cl.
CPC ............ *B62D 33/0207* (2013.01); *B60R 9/06* (2013.01)

(58) Field of Classification Search
CPC .. B60R 9/06; B60R 9/00; B60R 11/06; B60R 9/065; B60R 2011/004; B60R 9/045; B60R 2011/008; B60R 2011/0084; B60R 2011/0052; B62D 33/0207; B60P 7/0815; B60P 3/40; B60P 7/12; B61D 45/003
USPC .................... 224/403–405; 410/32, 35, 36
See application file for complete search history.

(56) References Cited

U.S. PATENT DOCUMENTS

| | | | | |
|---|---|---|---|---|
| 4,046,273 A | * | 9/1977 | Hughes ................. | B60P 3/1008 414/462 |
| 4,411,461 A | * | 10/1983 | Rosenberg ................ | B60R 9/06 211/17 |
| 4,867,497 A | * | 9/1989 | Jayne .................... | B60P 7/0815 296/3 |
| 5,108,141 A | * | 4/1992 | Anderson ................ | B60R 9/00 211/182 |
| 5,152,570 A | * | 10/1992 | Hood ........................ | B60P 3/42 296/3 |
| 5,560,666 A | * | 10/1996 | Vieira ....................... | B60P 3/40 224/402 |
| 5,924,615 A | * | 7/1999 | McGarrah ................ | B60R 9/00 220/482 |
| 6,007,129 A | * | 12/1999 | Kearney, Jr. ............ | B60R 11/06 224/404 |
| 6,065,942 A | * | 5/2000 | Glidden .................. | F04B 41/02 224/404 |
| 6,340,106 B1 | | 1/2002 | Dutton | |
| 6,378,819 B1 | * | 4/2002 | Johnson .................... | B60R 9/06 24/525 |

(Continued)

*Primary Examiner* — Adam J Waggenspack
(74) *Attorney, Agent, or Firm* — Muir Patent Law, PLLC (57) ABSTRACT

Disclosed is a vehicle rack comprising a bed mount configured to be mounted on a vehicle bed, the bed mount comprising: a mounting plate including a first portion adjacent to an inner wall of the vehicle bed, a second portion adjacent to an outer wall of the vehicle bed, and a third portion connecting the first and second portions, at least two mounting shaft sleeves attached to the second portion of the mounting plate, and a receptacle configured to be detachably connected to the bed mount, the receptacle comprising: at least two mounting shafts, each configured to be inserted into a corresponding one of the at least two mounting shaft sleeves, a plurality of pairs of through holes in the mounting shafts, and at least one stop pin configured to be positioned within at least one pair of the plurality of pairs of through holes.

13 Claims, 12 Drawing Sheets

(56) References Cited

U.S. PATENT DOCUMENTS

| | | | | |
|---|---|---|---|---|
| 6,517,134 B2* | 2/2003 | Armstrong | ............... | B60P 3/40 224/405 |
| 6,565,300 B2* | 5/2003 | Herring | ............... | B60P 7/0815 29/270 |
| 6,695,375 B1* | 2/2004 | May | ............... | B60R 9/00 224/281 |
| 6,913,277 B2* | 7/2005 | Mrofka | ............... | B60D 1/52 280/491.5 |
| 6,983,968 B2* | 1/2006 | Brauer | ............... | B62D 33/0207 224/405 |
| 7,494,169 B2 | 2/2009 | Collins | | |
| 7,736,105 B2* | 6/2010 | Landry | ............... | B60P 3/07 410/7 |
| 7,802,709 B1* | 9/2010 | Lewis | ............... | B60R 9/00 224/560 |
| 8,286,996 B2* | 10/2012 | Grant | ............... | B60R 21/026 280/748 |
| 8,393,665 B2* | 3/2013 | Villano | ............... | B60R 11/06 296/37.6 |
| 8,662,366 B1* | 3/2014 | DeZonia | ............... | B60R 9/04 224/405 |
| 9,616,820 B2* | 4/2017 | Raley | ............... | B60R 3/00 |
| 9,650,085 B2 | 5/2017 | Wilson | | |
| 10,046,691 B2 | 8/2018 | Petru | | |
| 2006/0261024 A1* | 11/2006 | Tovell | ............... | B60R 9/00 211/175 |
| 2008/0079277 A1* | 4/2008 | Wethington | ............... | B60R 9/0485 296/3 |
| 2009/0189403 A1* | 7/2009 | Voglmayr | ............... | B60P 1/02 296/3 |
| 2012/0261450 A1* | 10/2012 | Moore | ............... | B25H 3/02 224/404 |

* cited by examiner

APPARATUS FOR MOUNTING ON A VEHICLE AND FOR TRANSPORTING MATERIALS, EQUIPMENT, AND GEAR

CROSS-REFERENCE TO RELATED APPLICATION

This application claims the benefit of priority under 35 U.S.C. § 119 to U.S. Provisional Application No. 62/702,409, filed Jul. 24, 2018, in the United States Patent and Trademark Office, the entire contents of which is hereby incorporated by reference.

FIELD OF THE INVENTION

This disclosure relates to an apparatus for mounting on a vehicle and, more particularly, to a rack for high or low mounting on a pickup truck and for transporting materials, equipment and gear.

BACKGROUND

Mounting racks are used extensively in both commercial and personal applications to mount and transport a variety of materials, equipment, and other gear. These racks function to support loads being carried in the bed of the pickup truck as well as to protect the driver and any passengers from the load being carried. However, these racks can interfere with other features of a truck bed, such as a tonneau cover, or disrupt the visual lines of the truck. In addition, traditional racks can be limited in their ability to accommodate larger items.

The disclosed embodiments have been provided to address these and other shortcomings.

SUMMARY

In some exemplary embodiments, the disclosure is directed to a apparatus for mounting on a vehicle and carrying materials, comprising: a bed mount configured to be affixed to a wall of a bed of the vehicle, the bed mount comprising: at least two hollow mounting shaft sleeves, and a plurality of holes in each of the at least two hollow mounting shaft sleeves; and a lower mounting box configured to be detachably connected to the bed mount, the lower mounting box comprising: a catch box, wherein the catch box has an open face configured to fit materials, at least two hollow mounting shafts configured to be inserted into the hollow mounting shaft sleeves, and a plurality of through holes in each of the at least two hollow mounting shafts; and at least one stop pin configured to through the plurality of holes and the plurality of through holes of the at least two hollow mounting shaft sleeves and the at least two hollow mounting shafts, respectively, and wherein the bed mount and the lower mounting box mount are fixed together at an adjustable height by the at least one stop pin.

In some exemplary embodiments, the disclosure is directed to a apparatus for mounting on a vehicle and carrying materials, comprising: a bed mount configured to be affixed to a wall of a bed of the vehicle, comprising: at least two mounting shaft sleeves, and a plurality of holes in the mounting shaft sleeves; and a high rack configured to be detachably connected to the bed mount, the high rack comprising: a u-shaped support, at least two mounting shafts, and at least one mounting shaft support beam, wherein the mounting shafts of the high rack are configured to be inserted into the corresponding mounting shaft sleeves of the bed mount, and the mounting shaft support beam is positioned across the at least two mounting shafts, and wherein the bed mount and the high rack are configured to be fixed together at a fixed height.

In some exemplary embodiments, the disclosure is directed to a vehicle rack comprising: a bed mount configured to be mounted on a vehicle bed, the bed mount comprising: a mounting plate including a first portion adjacent to an inner wall of the vehicle bed, a second portion adjacent to an outer wall of the vehicle bed, and a third portion connecting the first and second portions, at least two mounting shaft sleeves attached to the second portion of the mounting plate, and a receptacle configured to be detachably connected to the bed mount, the receptacle comprising: at least two mounting shafts, each configured to be inserted into a corresponding one of the at least two mounting shaft sleeves, a plurality of pairs of through holes in the mounting shafts, and at least one stop pin configured to be positioned within at least one pair of the plurality of pairs of through holes.

BRIEF DESCRIPTION OF THE DRAWINGS

The foregoing summary, as well as the following detailed description of example embodiments of this invention, will be better understood when read in conjunction with the appended drawings and the appendix at the end of this application. For the purpose of illustrating the invention, there are shown in the drawings embodiments which are presently preferred. It is understood, however, that the invention is not limited to the precise arrangements and instrumentalities shown. In the drawings.

DETAILED DESCRIPTION

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of features and components may be exaggerated for clarity. Like numbers refer to like elements throughout. Though the different figures show variations of exemplary embodiments, these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration. The terminology used herein is for the purpose of describing particular embodiments only and is not intended to be limiting of the invention.

Figure 1:
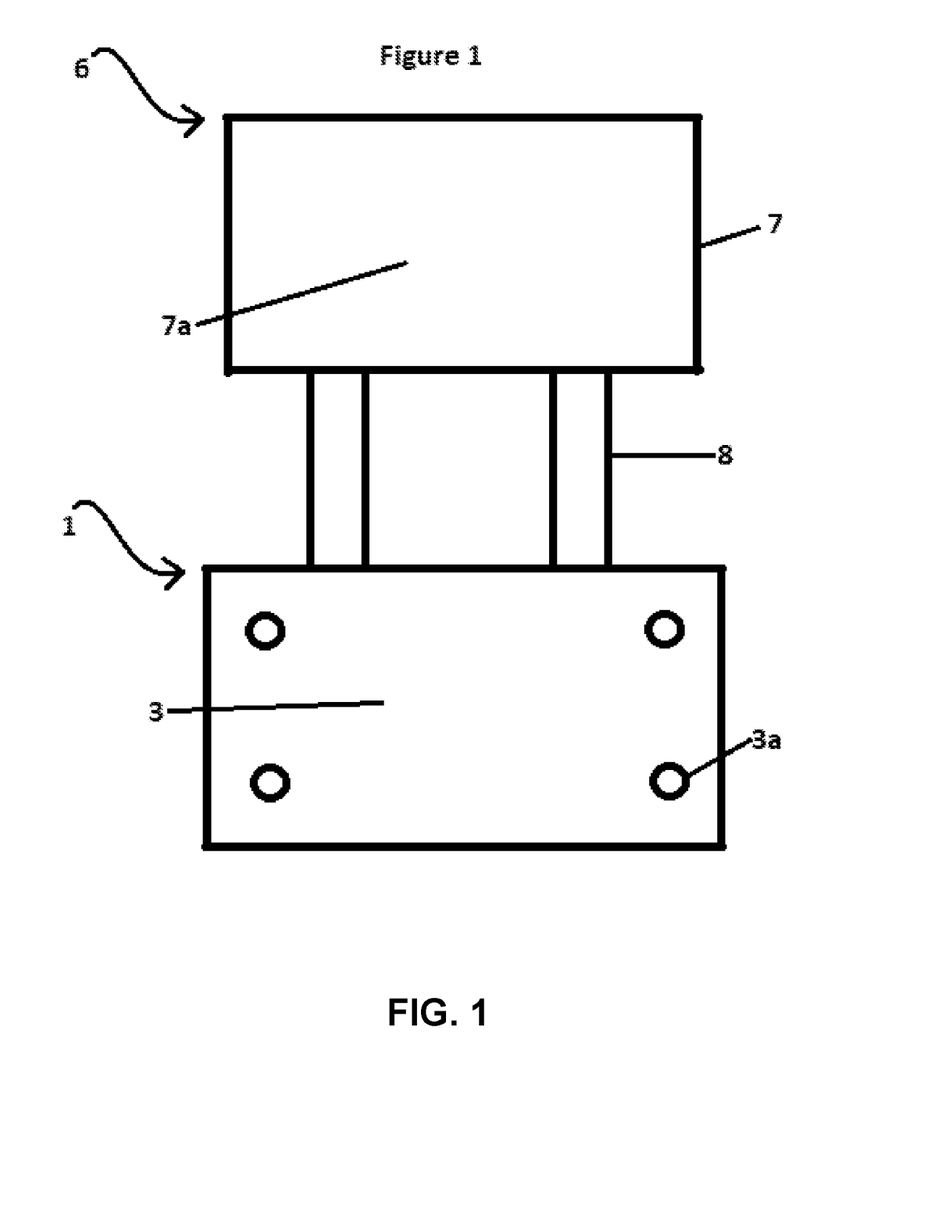
FIG. 1 is a frontal view of a bed mount and a lower mounting box for carrying materials on a pickup truck or other vehicle, according to certain example embodiments.
Figure 2:
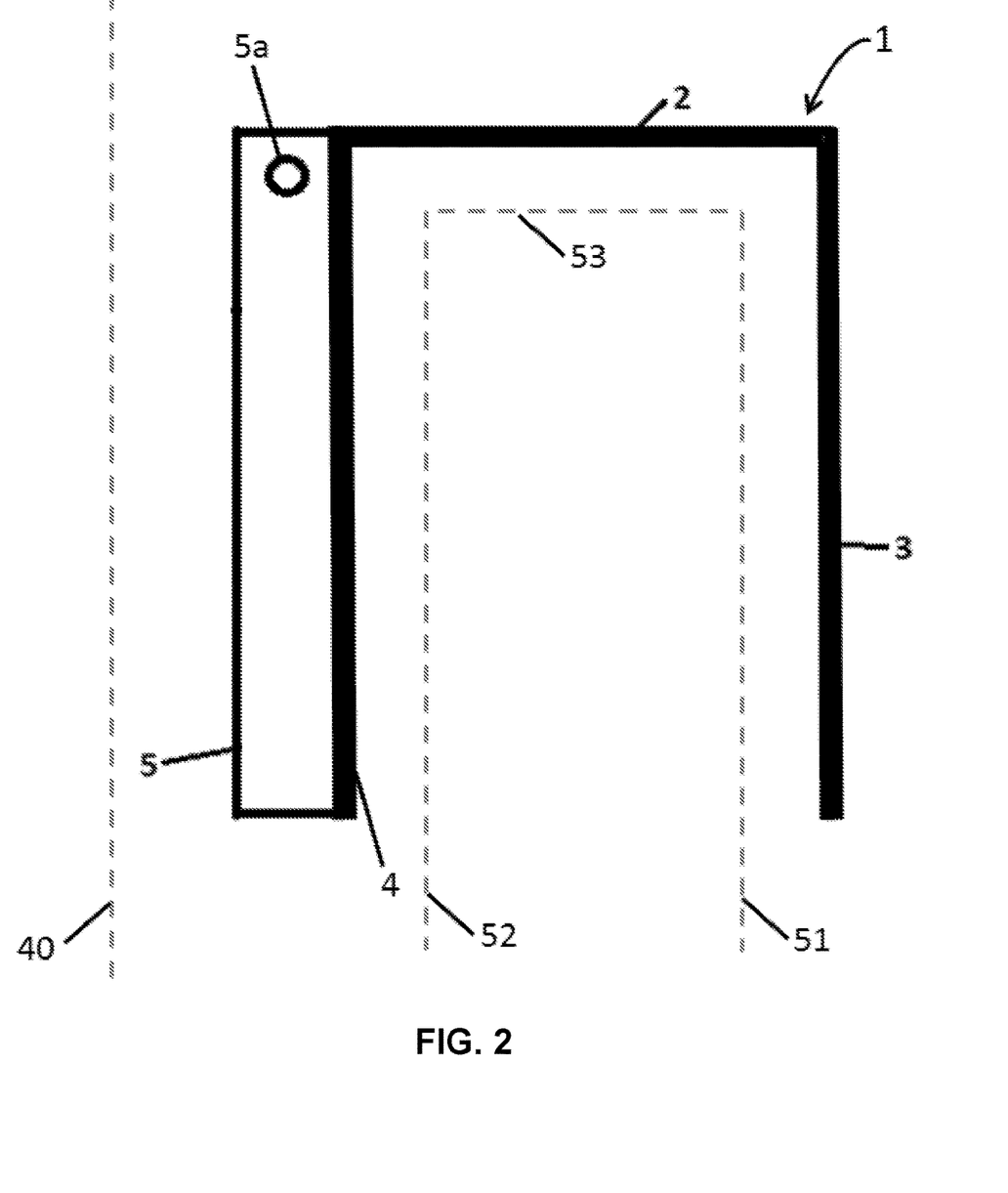
FIG. 2 is a side view of the bed mount, according to certain example embodiments.
Figure 3:
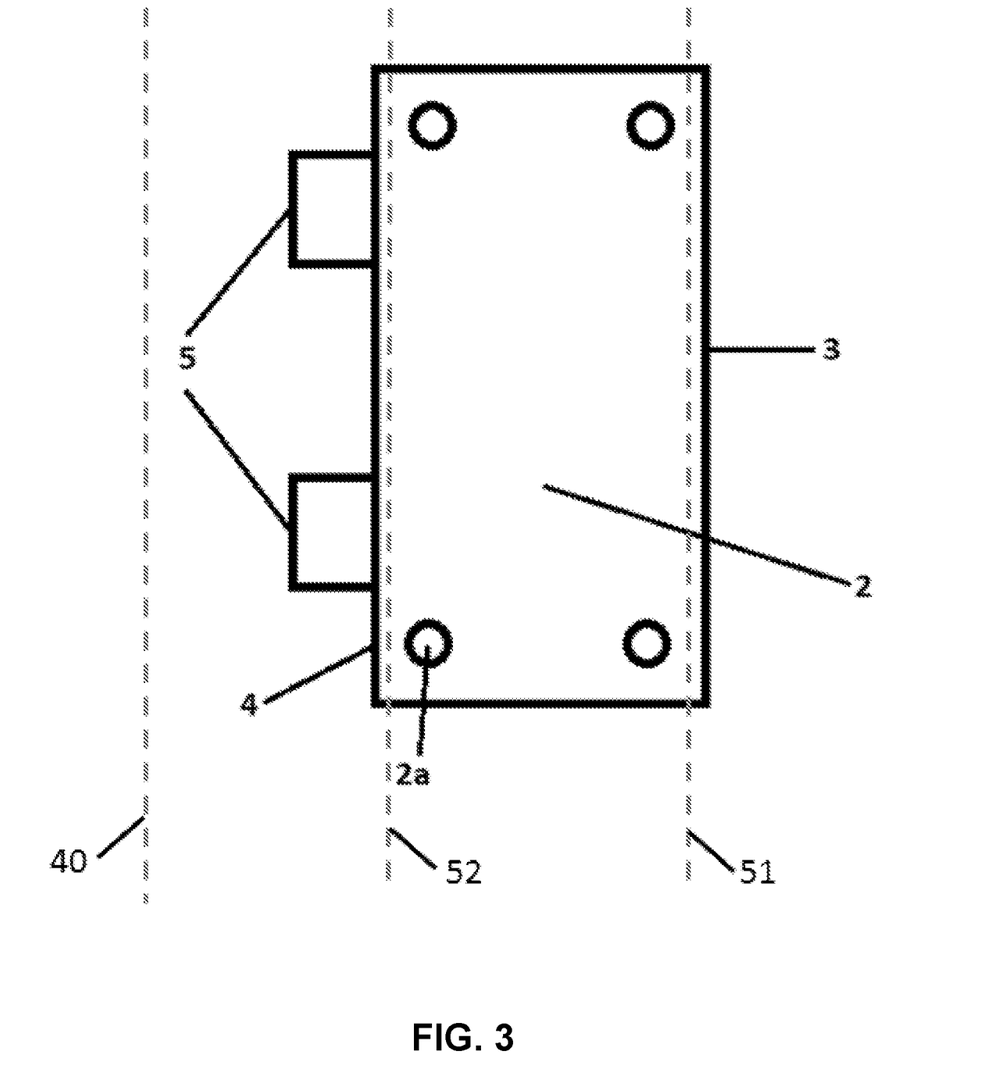
FIG. 3 is an overhead view of the bed mount, according to certain example embodiments.
Figure 4:
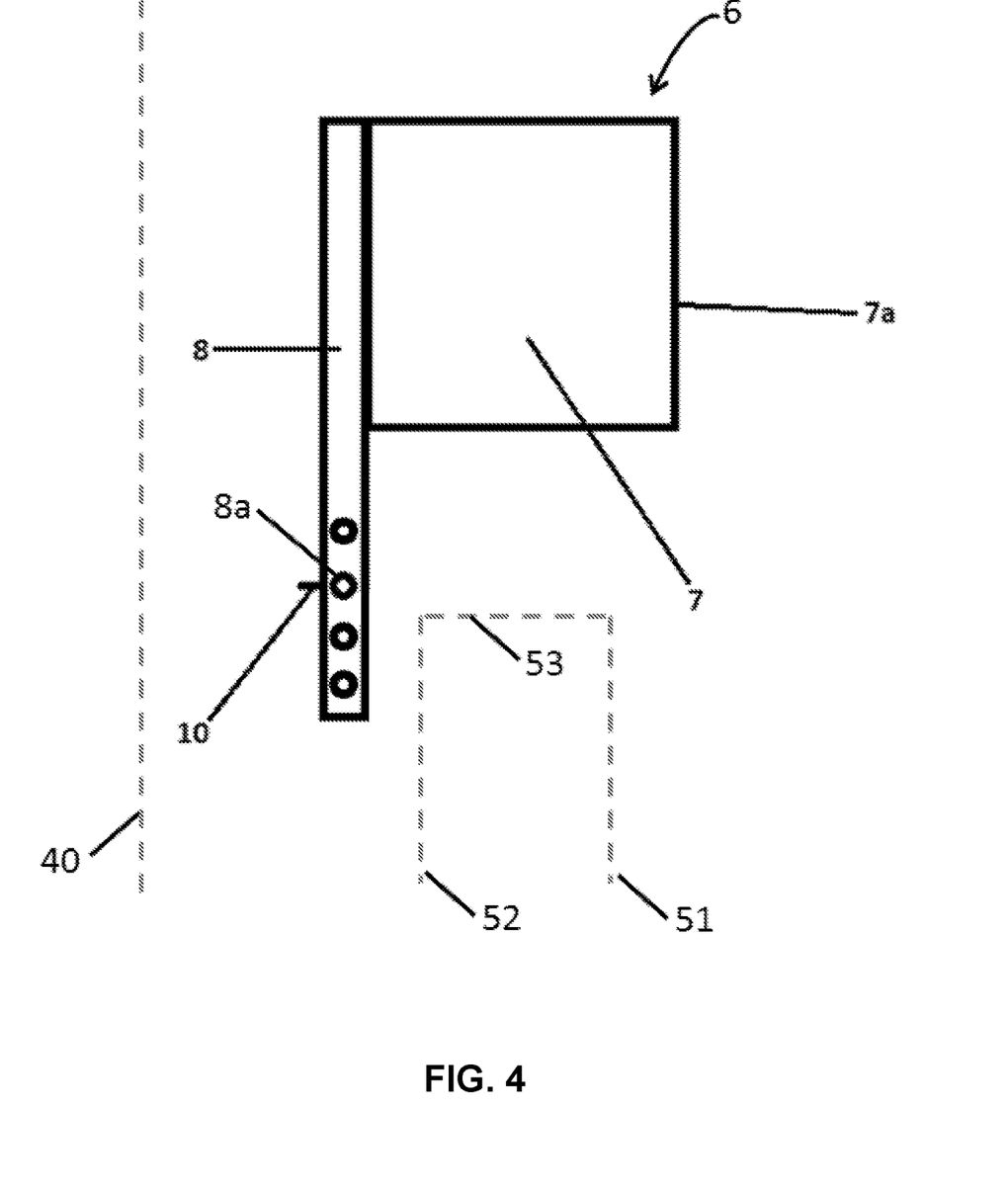
FIG. 4 is a side view of the lower mounting box, according to certain example embodiments.

FIG. 1 is diagram illustrating a frontal view of a bed mount 1 and a receptacle (e.g., a lower mounting box 6) for carrying materials on a pickup truck or other vehicle, according to certain example embodiments. FIG. 2 is a side view of the bed mount 1, and FIG. 3 is an overhead view of the bed mount 1. FIG. 4 is a side view of the lower mounting box 6, and FIG. 5 is a frontal view of the lower mounting box 6. In the drawings, dashed lines are used to illustrate an orientation of the bed mount 1 and lower mounting box 6 with respect to an external wall 40 of a vehicle cab (e.g., a truck cab), an inside wall 51 of a vehicle bed (e.g., a truck bed), an outside wall 52 of the vehicle bed, and a top wall 53 of the vehicle bed.

Referring to FIGS. 1, 2, and 3, the bed mount 1 may be a u-shaped mounting plate comprising at least three planar portions. For example, the bed mount may include a bed mount top plate 2, a bed mount bed side plate 3, and a bed mount cab side plate 4. In some embodiments, the bed mount 1 may be formed of a single piece of rigid material (e.g., a metal) that can be bent to form the bed mount top plate 2, the bed mount bed side plate 3, and the bed mount cab side plate 4. The bed mount 1 may straddle and/or conform to the wall of the truck bed. For example, the bed mount top plate 2 may be adjacent to a top wall 53 of the truck bed, the bed mount side plate 3 may be adjacent to an inside wall 51 of the truck bed, and the bed mount side plate 4 may be adjacent to an outside wall 52 of the truck bed. The bed mount top plate 2 may connect the bed mount side plate 3 and the bed mount side plate 4. In some embodiments, the bed mount side plate 3 and the bed mount side plate 4 may be substantially parallel to one another, and the bed mount top plate 2 may be substantially perpendicular to the bed mount side plate 3 and the bed mount side plate 4.

In some embodiments, the bed mount 1 may be affixed to one or more of the inside wall 51, the outside wall 52, and the top wall 53. For example, referring to FIG. 1, a plurality of holes 3a may be provided in the bed mount side plate 3. A plurality of screws or bolts may be inserted through the holes 3a to affix the bed mount 1 to the inside wall 51 of the truck bed. In the example of FIG. 1, four holes 3a are positioned symmetrically about the bed mount side plate 3. However, the embodiments are not limited thereto, and the number and spacing of holes 3a may vary, or can be omitted altogether. For example, a greater or lesser number of holes 3a may be included according to the make and model of trucks to be fitted with the bed mount 1. In some embodiments, the plurality of holes 3a may be replaced with a plurality of thumbscrews.

Referring to FIG. 2, which is a side view of the bed mount 1, the bed mount 1 may further include at least two mounting shaft sleeves 5. The bed mount cab side plate 4 and the at least two mounting shaft sleeves 5 may be disposed in the gap between the outside wall 52 of the truck bed and the external wall 40 of the truck cab. The sleeves 5 may be wide enough to fill the aforementioned gap but not span the entire gap between the bed mount cab side plate 4 and the external wall 40 of the truck cab. In this way, it is understood that the sleeves 5 do not contact the external wall 40 of the truck cab.

In some embodiments, the sleeves 5 may extend lengthwise in the vertical direction along the bed mount cab side plate 4. While FIG. 2 illustrates the sleeves 5 having a length that is substantially the same as the vertical height of the bed mount cab side plate 4, the embodiments are not limited thereto. For example, the sleeves 5 may have a length that is less than or greater than the vertical height of the bed mount cab side plate 4. In some embodiments, the at least two mounting shaft sleeves 5 may extend in parallel with one another. For example, the sleeves 5 may include two hollow rectilinear bars that extend lengthwise in parallel with one another and that are spaced the same distance on opposite sides of a center vertical reference line of the bed mount 1. In other embodiments, the sleeves may mirror one another. For example, the sleeves 5 may have segments (e.g., vertical segments, horizontal segments, and/or angled segments), where the segments mirror one another on opposite sides of a center vertical reference line of the bed mount 1.

Referring to FIGS. 2 and 3, each of the at least two mounting shaft sleeves 5 may be hollow rectilinear bars. For example, as illustrated in FIG. 3, which is a top-down view, each mounting shaft sleeve 5 may have four walls surrounding a hollow space. Each mounting shaft sleeve 5 may include a plurality of mounting sleeve holes 5a positioned vertically along the mounting shaft sleeves 5. In some example embodiments, the mounting sleeve holes 5a may be provided in pairs, such that a pin may extend horizontally from one hole 5a to another hole 5a that is on the same vertical level in an opposite wall of the sleeve 5. As will be discussed further below, the plurality of holes 5a may align with a plurality of mounting shaft through holes 8a of a hollow mounting shaft 8 and a stop pin 10 may be inserted therethrough. The number of these holes 5a and their relative spacing may be altered as desirable for the shape of a truck (e.g., truck bed or truck cab) or other vehicle. For example, the number of holes 5a may be greater than that illustrated. In some example embodiments, when the bed mount 1 is made of steel, the mounting shaft sleeves 5 may be affixed to the bed mount cab side plate 4 by welding. In other embodiments, the mounting shaft sleeves 5 may be integrally formed with the bed mount 1.

Referring to FIG. 3, which is a top-down view of the bed mount top plate 2, the bed mount 1 may include a plurality of holes 2a in the bed mount top plate 2. A plurality of screws or bolts may be inserted through the holes 2a to affix the bed mount 1 to the top wall 53 of the truck bed. In the example embodiment of FIG. 3, the plurality of top holes 2a are positioned symmetrically about the bed mount top plate 2. However, the embodiments are not limited thereto, and the number and spacing of holes 2a may vary, or the holes 2a can be omitted altogether. For example, a greater or lesser number of holes 2a may be included according to the make and model of trucks to be fitted with the bed mount 1. In some embodiments, the plurality of holes 2a may be replaced with a plurality of thumbscrews. This top view of a bed mount 1 also depicts the hollow nature of the at least two mounting shaft sleeves 5 and the relative positions of these mounting shaft sleeves 5 along the bed mount cab side plate 4.

Referring to FIGS. 1, 4, and 5, the lower mounting box 6 may comprise a catch box 7, at least two hollow mounting shafts 8, and an L-shaped stop pin 10. The open face 7a of the lower mounting box 6 faces a bed of a pickup truck or other vehicle. For example, the open face 7a may open in a direction opposite to or away from that of the external wall 40 of the truck cab.

FIG. 4 illustrates the position of the at least two hollow mounting shafts 8 extending from the catch box 7. Each mounting shaft 8 may have four walls surrounding a hollow space. This side view of the lower mounting box 6 also illustrates the mounting shaft through holes 8a and the placement of the stop pin 10 in the through holes 8a. The mounting shaft through holes 8a may be provided in pairs, such that a pin may extend horizontally from one hole 8a to another hole 8a that is on the same vertical level in an opposite wall of the same mounting shaft 8.

In some embodiments, the lower mounting box 6 may comprise at least two mounting shafts 8 extending from a back side of the catch box 7. For example, the at least two mounting shafts 8 may be attached to the side of the catch box 7 between the catch box 7 and the external wall 40 of the vehicle cab. In some embodiments, when the catch box 7 is made of steel, the mounting shafts 8 may be affixed to the catch box 7 by welding. In other embodiments, the mounting shafts 8 may be integrally formed with the catch box 7. The open face 7a of the lower mounting box 6 faces the truck bed such that pipes, ladders, or other materials may be positioned with one end resting in the lower mounting box 6 and one end resting in the truck bed and/or resting on a second attachment at the distal end of the truck bed.

In an example embodiment, the at least two mounting shafts 8 extending from the lower mounting box 6 may be inserted into the corresponding mounting shaft sleeves 5. When the mounting shafts 8 are inserted into the mounting shaft sleeves 5, the mounting shafts 8 may be at least partially disposed between the vehicle cab 40 and the outside wall 52 of the vehicle bed. In some embodiments, the mounting shafts 8 are slid into position within the mounting shaft sleeves 5 so that the through holes 8a align with the plurality of mounting sleeve holes 5a. When the through holes 8a are aligned with the mounting sleeve holes 5a, a stop pin 10 is then positioned through the holes 5a and the through holes 8a such that the lower mounting box 6 is secured into place with the bed mount 1. In some embodiments, when the mounting shafts 8are inserted into the mounting shaft sleeves 5, the lower mounting box 6 may be considered to be detachably connected to the bed mount 1. While one ordinarily skilled in the art would appreciate that the series of holes 5a can be selected for alignment with the through holes 8a such that the lower mounting box 6 can be positioned at a variable and desirable height above the wall of the truck bed.

In other embodiments, the through holes 8a do not need to be aligned with the mounting sleeve holes 5a. In such embodiments, the L-shaped stop pin 10 may be inserted into the holes 8a such that the stop pin 10 rests on top of the mounting sleeves 5, stopping the mounting shafts 8 from being further inserted into the corresponding sleeves 5.

Referring to FIG. 4, the side view also depicts the mounting shaft through holes 8a in the mounting shafts 8 and the stop pin 10 positioned through the aforementioned holes 8a. While FIG. 4 illustrates a single stop pin 10, the embodiments are not limited thereto. For example, the single stop pin 10 may be replaced with two stop pins, each extending through a single mounting shaft 8 inserted into a corresponding sleeve 5, with a permanent stop, or with any other suitable catch mechanism without departing from the scope of the present invention.

FIGS. 5A, 5B, 5C, and 5D illustrate the open face 7a of the catch box 7 where an insert 9 is provided for protection of the carried materials. As shown in FIGS. 5A-5D, the lower mounting box 6 can include a removable insert 9 positioned within the catch box 7. The insert 9 may be added as a method of preventing wearing on the catch box 7 and/or the materials carried therein. In some embodiments, the removable insert 9 may be, for example, a foam or elastomer insert. Alternatively, the insert 9 can be made of fabric, polymer, elastomer, or any other suitable material without departing from the scope of the present invention. The shape of the insert 9 may conform to the shape of the interior of the lower mounting box 6. In some embodiments, the insert 9 may be shaped like a rectangular box with a right rectangular frustum removed from the outward facing side. This invention may allow for the transport of materials such as pipes, kayaks, or various objects. In the case of carrying a squared ladder, the foam insert 9 may be removed to accommodate the shape of the ladder.

Additionally, FIGS. 5A, 5B, 5C, and 5D illustrate embodiments in which the mounting shafts 8 are inserted into the hollow mounting shaft sleeves 5. In the embodiments of FIGS. 5A-5D, the stop pin 10 may be positioned to extend through pairs of the mounting shaft through holes 8a provided in each of the hollow mounting shafts 8. As shown in FIGS. 5A-5D, the stop pin 10 may be an L-shaped stop pin 10, where one distal end of the L-shaped stop pin 10 may form the bend and resulting L-shape. The opposite distal end may include a hole 10a for attaching a lock, locking bolt, or other locking device. These various locking devices are intended to keep the L-shaped stop pin 10 from being removed due to ordinary use or tampering.

Figure 5A:
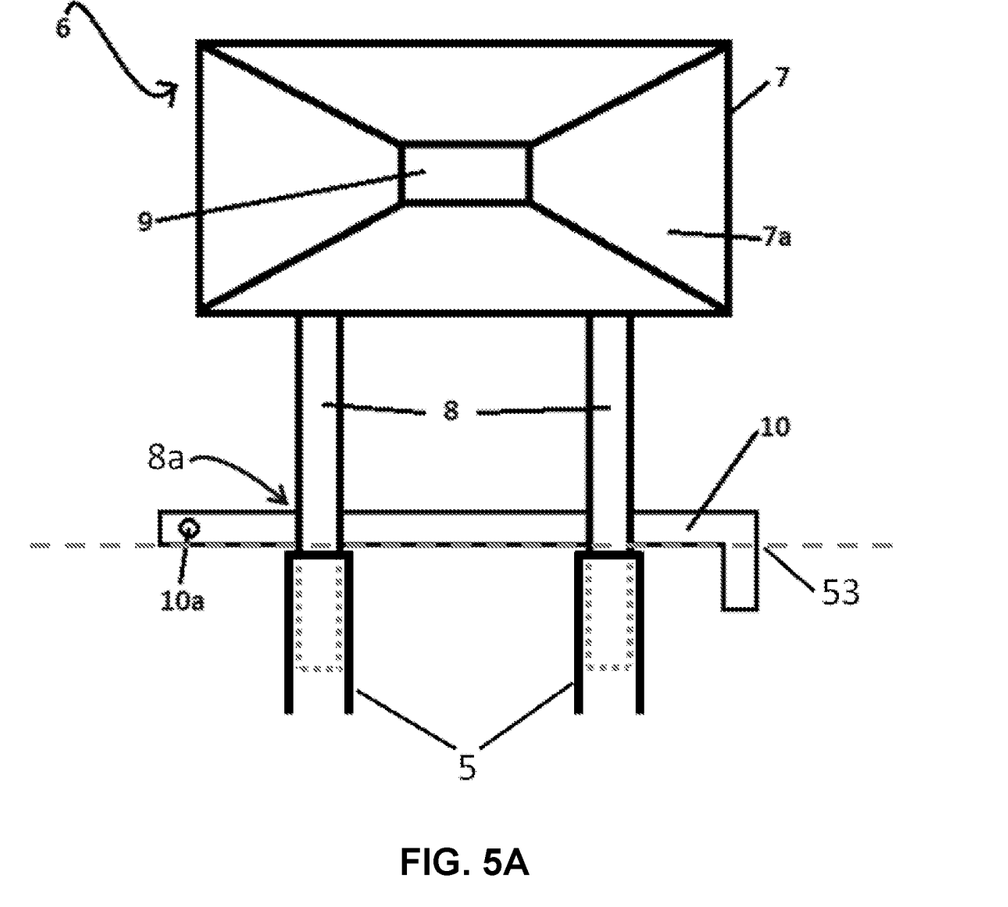
FIG. 5A is a frontal view of the lower mounting box, according to certain example embodiments.

In the example of FIG. 5A, the stop pin 10 is disposed above a top wall 53 of the truck bed, and extends only through the aligned pairs of through holes 8a of the mounting shafts 8. In FIG. 5A, the stop pin 10 rests on the upper surface of the mounting shaft sleeves 5.

Figure 5B:
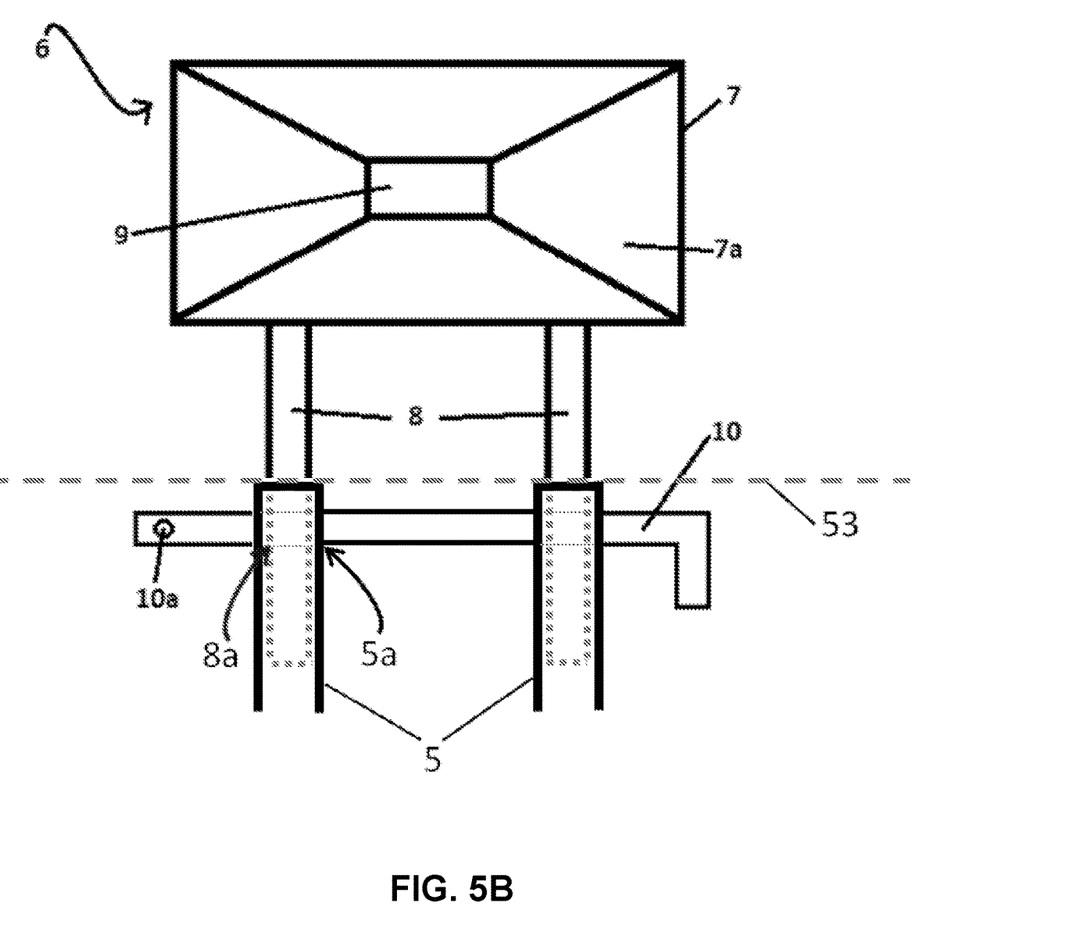
FIG. 5B is a frontal view of the lower mounting box, according to certain example embodiments.

In the example of FIG. 5B, the stop pin 10 is disposed at or below a top wall 53 of the truck bed, and extends through the aligned pairs of holes 5a of the hollow mounting shaft sleeves 5 and the through holes 8a of the mounting shafts 8.

Figure 5C:
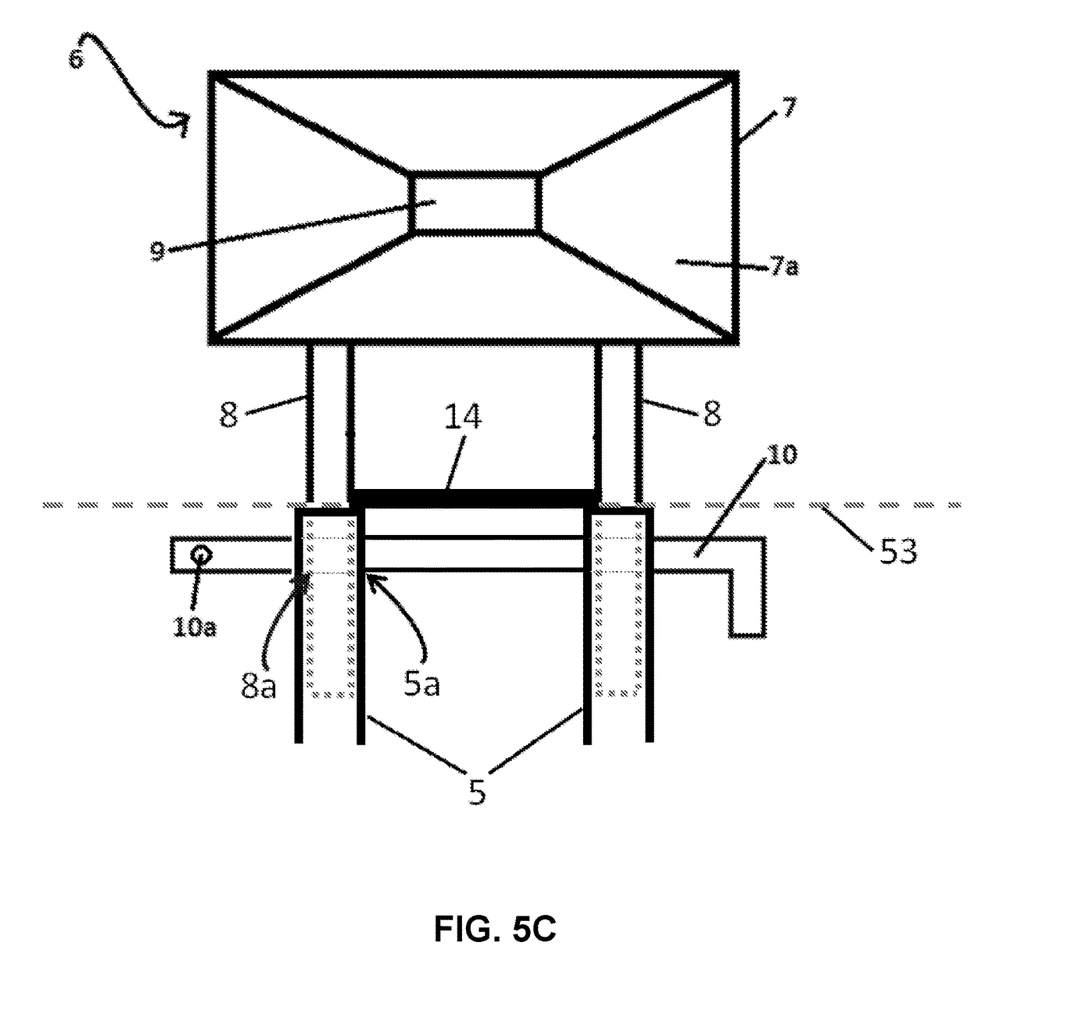
FIG. 5C is a frontal view of the lower mounting box, according to certain example embodiments.

In the example of FIG. 5C, a mounting shaft support beam 14 is further provided. The support beam 14 may span the space between the hollow mounting shafts 8. A first end of the support beam 14 may be fixedly attached to a first one of the mounting shafts 8 and a second end of the support beam 14 may be fixedly attached to the other one of the mounting shafts 8. For example, the opposite ends of the support beam 14 may be welded to respective ones of the mounting shafts 8. The support beam 14 may be positioned at a point between the mounting shafts 8 such that the support 12 remains at a fixed height above the truck cab and allows longer loads to extend forward above the cab of the truck. In some embodiments, the support beam 14 may form a stop, such that the hollow mounting shafts 8 are prevented from being further inserted into corresponding mounting shaft sleeves 5. For example, the support beam 14 may rest on upper ends of interior walls of the mounting shaft sleeves 5. In some embodiments, the support beam 14 may be at a higher vertical level than a top wall 53 of the truck bed. In other embodiments, the support beam 14 may be at a vertical level at or below that of the top wall 53 of the truck bed, such that the support beam 14 is at least partially hidden from view. The support beam 14, in conjunction with the stop pin 10, may provide additional security, rigidity, and stability to the lower mounting box 6. In some embodiments, the stop pin 10 may not be included.

Figure 5D:
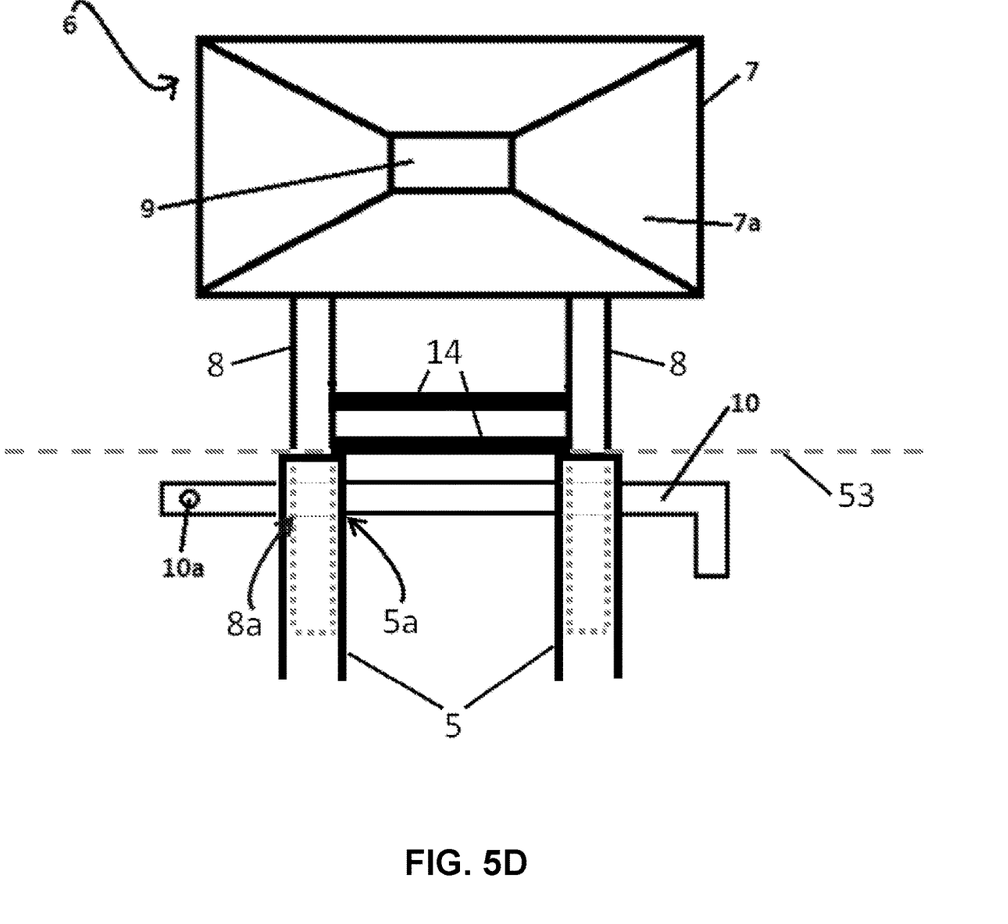
FIG. 5D is a frontal view of the lower mounting box, according to certain example embodiments.

In the example of FIG. 5D, a plurality of mounting shaft support beams 14 are provided. In such embodiments, a bottom one of the support beams 14 may form a stop, preventing the hollow mounting shafts 8 from being further inserted into corresponding mounting shaft sleeves 5. For example, the bottommost one of the support beams 14 may rest on upper surfaces of interior walls of the mounting shaft sleeves 5. As discussed above, the plurality of support beams 14, in conjunction with the stop pin 10, may provide additional security, rigidity, and stability to the lower mounting box 6. In some embodiments, three or more support beams 14 may be provided.

Figure 6A:
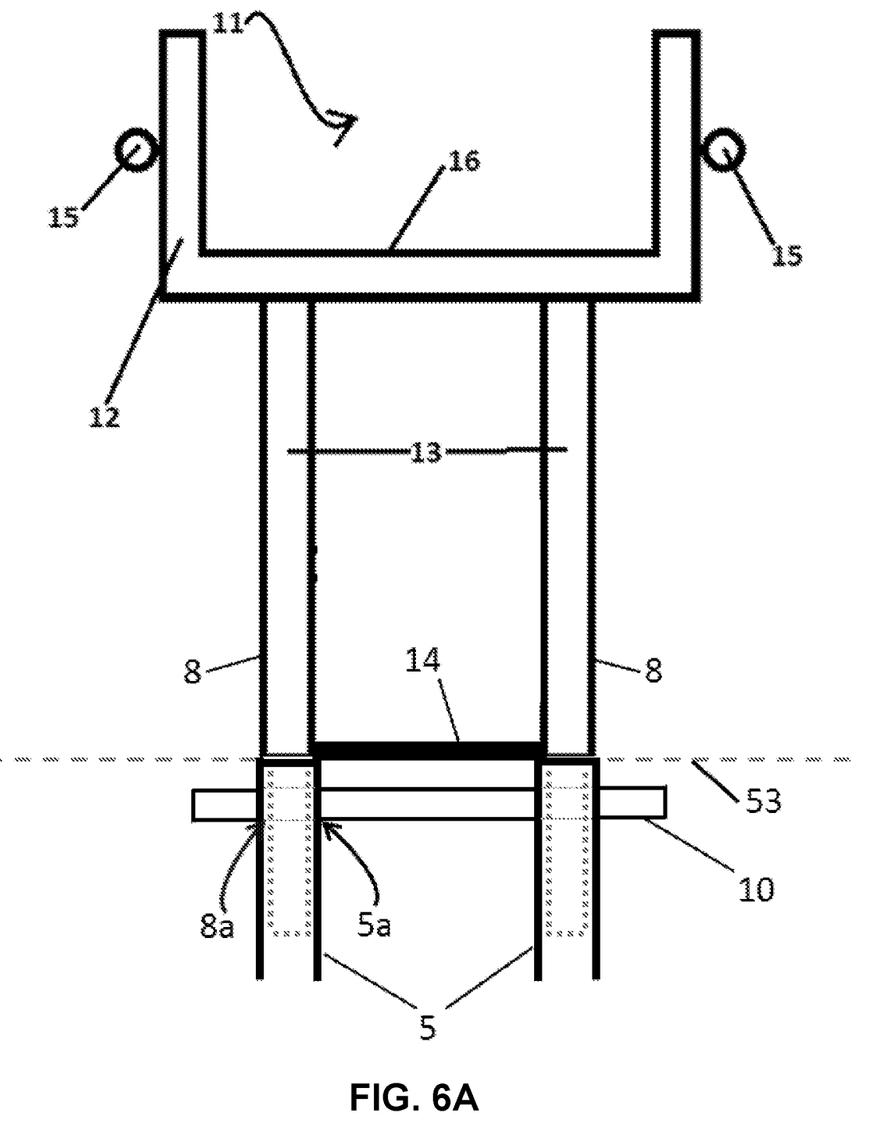
FIG. 6A is a frontal view of a lower mounting box for carrying materials, according to certain example embodiments.
Figure 6B:
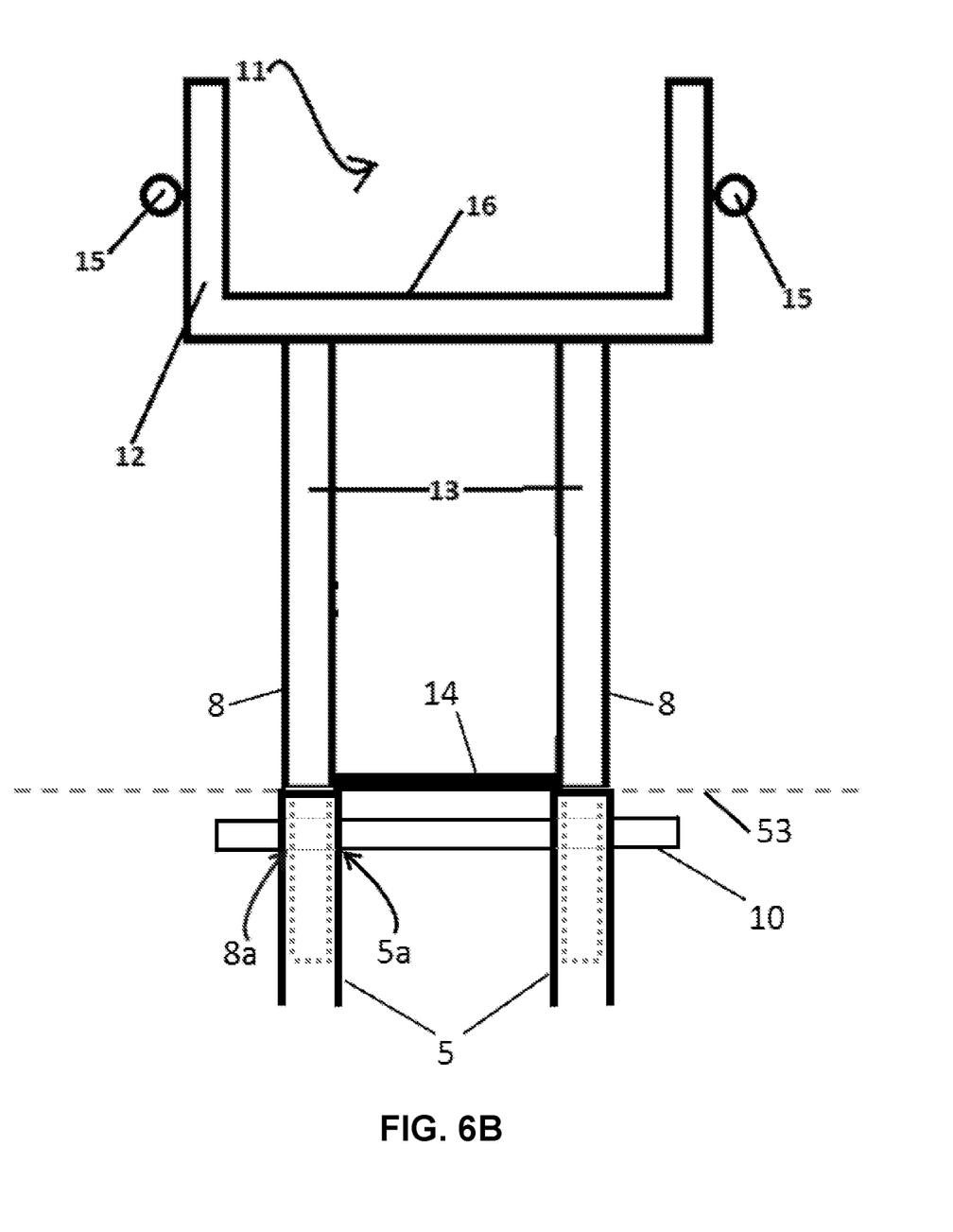
FIG. 6B is a frontal view of a lower mounting box for carrying materials, according to certain example embodiments.

FIGS. 6A and 6B are frontal views of another example embodiment of a receptacle for carrying materials. Referring to FIG. 6A, the receptacle may take the form of a high rack 11. The high rack 11 may comprise a support 12, at least two hollow mounting shafts 13, a mounting shaft support beam 14, fastening rings 15, and a rest material 16. The high rack 11 may be a receptacle configured to carry, for example, ladders, pipes, etc.

As shown in FIG. 6A, the support 12 may have a squared U shape, and may include fastening rings 15 for retaining the load material. In FIG. 6A, the fastening rings 15 are positioned at opposite sides of the squared U-shape support 12 so that a bungee cord, rope, or other restraining device may be used to secure the ladder, pipes, or other materials inside the squared U-shape. The fastening rings 15 may be fixedly attached to opposite outside surfaces of the support 12. For example, the fastening rings 15 may be welded to the support 12.

The rest material 16 may be provided on an inside surface of the support 12. For example, the rest material 16 may line the interior edge of the squared U-shaped support 12. The rest material 16 may comprise carpet, foam, rubber, or other materials and may be provided to reduce wearing between the carried materials and the support 12. One ordinarily skilled in the art would appreciate that loads other ladder or pipe may be secured and carried by this high rack 11.

The hollow mounting shafts 13 may include at least one mounting shaft support beam 14 spanning the space between the hollow mounting shafts 13. A first end of the support beam 14 may be fixedly attached to a first one of the mounting shafts 13, and a second end of the support beam 14 may be fixedly attached to the other one of the mounting shafts 13. For example, the opposite ends of the support beam 14 may be welded to respective ones of the mounting shafts 13. The support beam 14 may be positioned at a point between the mounting shafts 13 such that the support 12 support remains at a fixed height above the truck cab and allows longer loads to extend forward above the cab of the truck. In some embodiments, the support beam 14 may form a stop, such that the hollow mounting shafts 8 are prevented from being further inserted into corresponding mounting shaft sleeves 5. For example, the support beam 14 may rest on upper ends of interior walls of the mounting shaft sleeves 5. In some embodiments, the support beam 14 may be at a higher vertical level than a top wall 53 of the truck bed. In other embodiments, the support beam 14 may be at a vertical level at or below that of the top wall 53 of the truck bed, such that the support beam 14 is at least partially hidden from view.

Referring to FIG. 6B, in some embodiments, a plurality of support beams 14 may be provided. In such embodiments, a bottom one of the support beams 14 may form a stop, preventing the hollow mounting shafts 8 from being further inserted into corresponding mounting shaft sleeves 5. For example, the bottommost one of the support beams 14 may rest on upper ends of interior walls of the mounting shaft sleeves 5. In some embodiments, three or more support beams 14 may be provided.

Figure 7A:
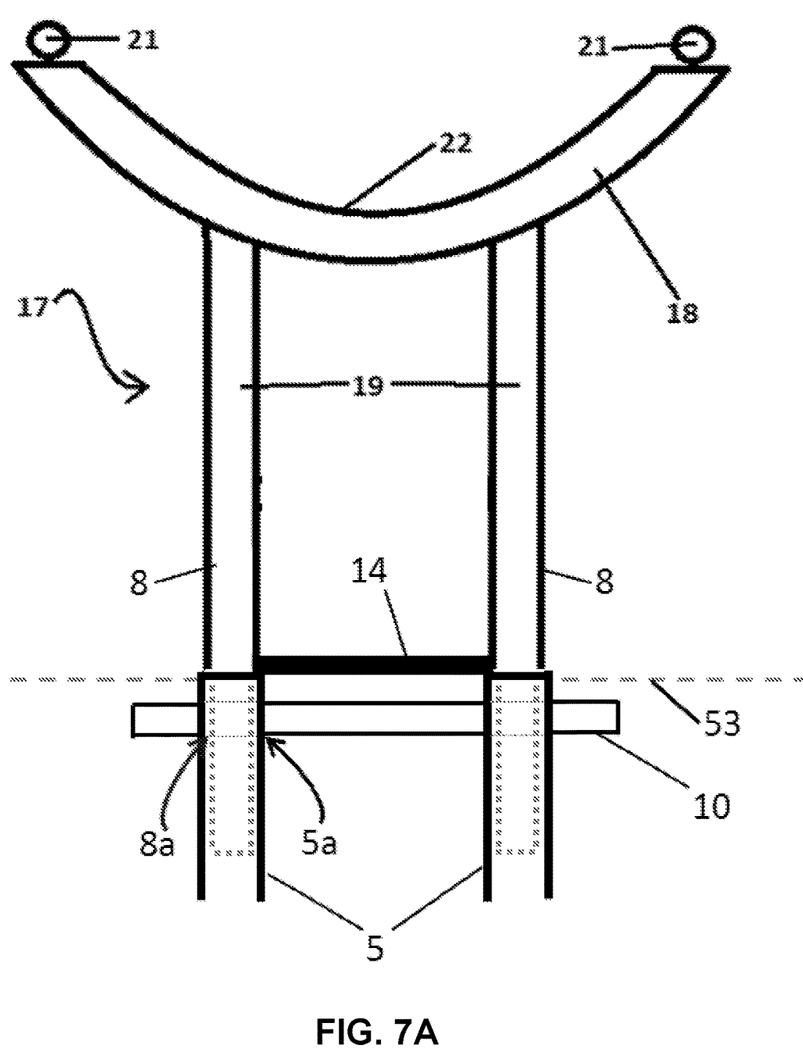
FIG. 7A is a frontal view of a lower mounting box for carrying materials, according to certain example embodiments.
Figure 7B:
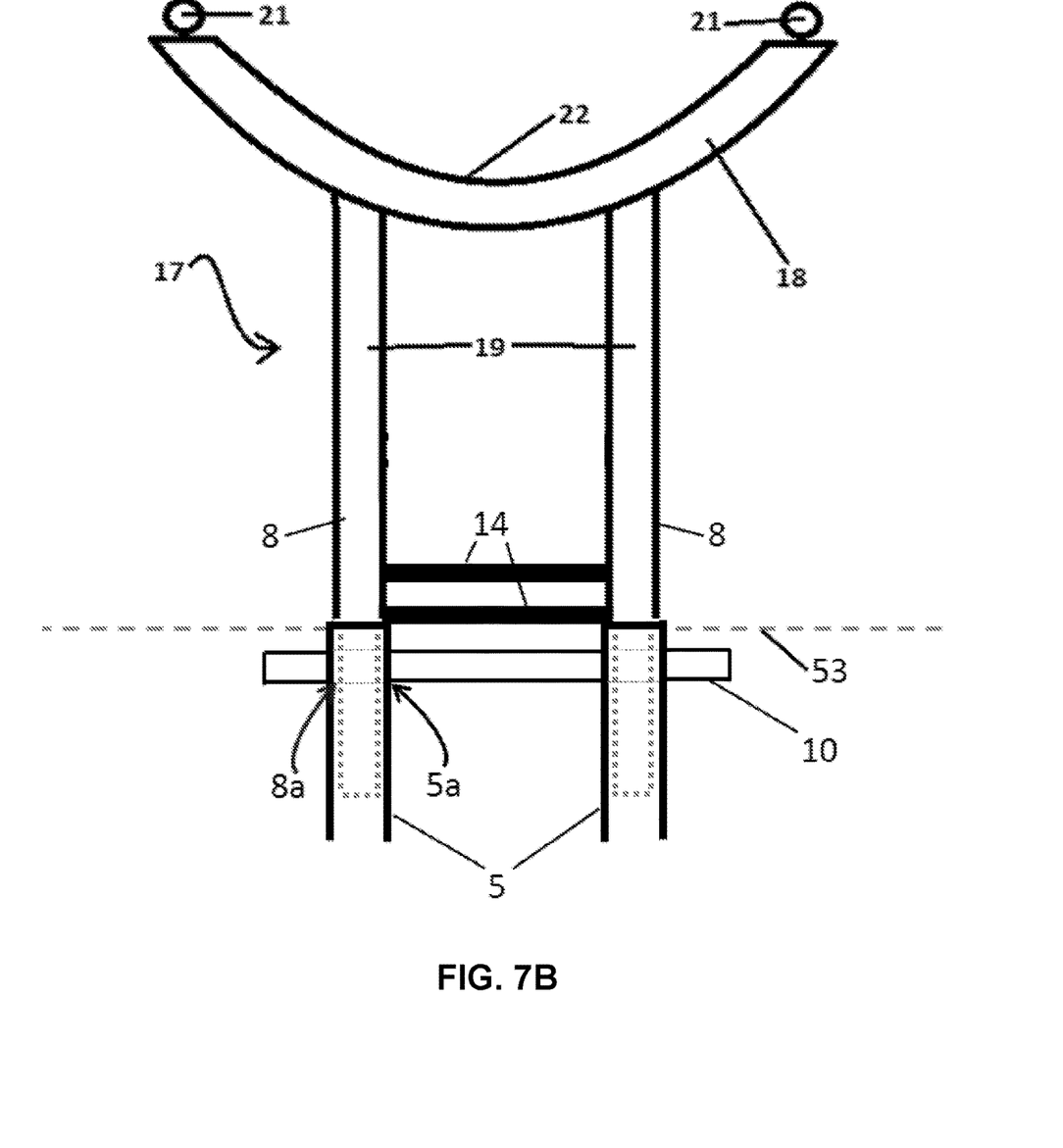
FIG. 7B is a frontal view of a lower mounting box for carrying materials, according to certain example embodiments.

FIGS. 7A and 7B are frontal views of another example embodiment of a receptacle for carrying materials. Referring to FIG. 7A, the receptacle may take the form of a high rack 17. The high rack 17 comprises a support 18, at least two hollow mounting shafts 19, at least one of mounting shaft support beams 14, fastening rings 21, and a rest material 22. The high rack 17 may be a receptacle configured to carry, for example, a canoe, a kayak, etc.

As shown in FIG. 7A, the support 18 may have a rounded U-shape, and may include fastening rings 21 for retaining the load material. In FIG. 7A, the fastening rings 21 are positioned at distal ends of the rounded U-shape of the support 18 so that a bungee cord, rope, or other restraining device may be used to secure the canoes, kayaks, or other materials inside the rounded U. The fastening rings 21 may be fixedly attached to the ends of the support 18. For example, the fastening rings 21 may be welded to the support 18.

The rest material 22 may be provided on an inside surface of the support 18. For example, the rest material 22 may line the interior edge of the rounded U-shaped support 18. The rest material 22 may comprise carpet, foam, rubber, or other materials that is capable of reducing or minimizing wearing between the carried materials and support 18. One ordinarily skilled in the art would appreciate that loads other canoes or kayaks may be secured and carried by this high rack 17.

The hollow mounting shafts 19 may include at least one mounting shaft support beam 14 spanning the space between the hollow mounting shafts 19. A first end of the support beam 14 may be fixedly attached to a first one of the mounting shafts 19, and a second end of the support beam 14 may be fixedly attached to the other one of the mounting shafts 19. For example, the opposite ends of the support beam 14 may be welded to respective ones of the mounting shafts 19. The support beam 14 may be positioned at a point between the mounting shafts 19 such that the support 18 remains at a fixed height above the truck cab and allows longer loads to extend forward above the cab of the truck. In some embodiments, the support beam 14 may form a stop, such that the hollow mounting shafts 8 are prevented from being further inserted into corresponding mounting shaft sleeves 5. For example, the support beam 14 may rest on upper ends of interior walls of the mounting shaft sleeves 5. In some embodiments, the support beam 14 may be at a higher vertical level than a top wall 53 of the truck bed. In other embodiments, the support beam 14 may be at a vertical level lower than the top wall 53 of the truck bed, such that the support beam 14 is hidden from view.

Referring to FIG. 7B, in some embodiments, a plurality of support beams 14 may be provided. In such embodiments, a bottom one of the support beams 14 may form a stop, preventing the hollow mounting shafts 8 from being further inserted into corresponding mounting shaft sleeves 5. For example, the bottommost one of the support beams 14 may rest on upper ends of interior walls of the mounting shaft sleeves 5. In some embodiments, three or more support beams 14 may be provided.

The apparatus of the present invention may be made from a strong, durable material such as, for example, 16 gauge steel. However, those of ordinary skill in the art will appreciate from this disclosure that any suitable material, such as allow, aluminum, composite, or the like, may be used without departing from the scope of the present invention. For example, the aforementioned apparatuses may be constructed of other gauges of steel, carbon fiber, plastic polymer matrices, or other materials may be used to construct the devices. Further, in some embodiments, the lower mounting box 6, the high rack 11, and the high rack 17 may be altered so that they can be permanently attached to the bed mount 1 for designated work trucks. However, in some embodiment, the receptacles (e.g., lower mounting box 6, high rack 11, and high rack 17) are configured to be removable when not in use with only the bed mount 1 being permanently installed. When the receptacles (e.g., lower mounting box 6, high rack 11, and high rack 17) are detached, leaving only the bed mount 1 installed, the design aesthetics of the vehicle may be unchanged.

The disclosed embodiments, including the bed mount 1 and receptacle (e.g., lower mounting box 6, high rack 11, and high rack 17) may be used in cooperation with a hitch-mounted rack. For example, when the lower mounting box 6 is used with the bed mount 1, a first end of a kayak or ladder may be inserted into the catch box 7 and a second end of the kayak or ladder may rest on the distal end of the vehicle bed and/or on a hitch-mounted rack. In such embodiments, the hitch-mounted rack may include a single hollow bar extending up from the hitch and either a squared or rounded u-shaped shaped rest on which the kayak or ladder can rest and be retained. As another example, when the high rack 11 is used with the bed mount 1, a first end of a ladder may rest on the high rack 11 and a second end of the ladder may rest on the distal end of the vehicle bed and/or on a hitch-mounted rack. In such embodiments, the hitch-mounted rack may include a single hollow bar extending up from the hitch and a squared u-shaped shaped rest on which the ladder can rest and be retained. As further example, when the high rack 17 is used with the bed mount 1, a first end of a kayak or canoe may rest on the high rack 17 and a second end of the ladder may rest on the distal end of the vehicle bed and/or on a hitch-mounted rack. In such embodiments, the hitch-mounted rack may include a single hollow bar extending up from the hitch and a rounded u-shaped shaped rest on which the kayak or canoe can rest and be retained.

While the disclosed embodiments describe the invention in connection with a truck, the disclosed embodiments may be configured for use on other vehicles, including but not limited to dump trucks, train cars, and boats.

What is claimed is:

1. An apparatus for mounting on a vehicle having an open bed and carrying materials, comprising:
    a bed mount comprising:
        a u-shaped mounting plate comprising a bed side plate inside the open bed of the vehicle, a cab side plate between a sidewall of the open bed and a cab of the vehicle, and a top plate including a plurality of holes for attaching the bed mount to a wall of the open bed of the vehicle, and
        at least two hollow mounting shaft sleeves attached to the cab side plate of the u-shaped mounting plate, each of the at least two hollow mounting shaft sleeves comprising a plurality of holes provided along vertical sides of the at least two hollow mounting shaft sleeves, and
    a mounting box configured to be detachably connected to the bed mount, the mounting box comprising:
        a catch box, wherein the catch box has an open face configured to fit materials, the open face facing the open bed of the vehicle, and
        at least two hollow mounting shafts configured to be inserted into the at least two hollow mounting shaft sleeves, respectively, and comprising a plurality of through holes along vertical sides of the at least two hollow mounting shafts; and
    at least one stop pin configured to extend through the plurality of holes of the at least two hollow mounting shaft sleeves and the plurality of through holes of the at least two hollow mounting shafts, and
    wherein the bed mount and the mounting box mount are fixed together at an adjustable height by the at least one stop pin,
    wherein the bed side plate and the cab side plate are parallel to one another and the top plate is perpendicular to both the bed side plate and the cab side plate,
    wherein the two hollow mounting shafts extend lengthwise in a direction perpendicular to the top plate of the u-shaped mounting plate, and
    wherein upper surfaces of the at least two hollow mounting shaft sleeves that are parallel to an upper surface of the top plate are at a same level as or at a lower level than the upper surface of the top plate.

2. The apparatus of claim 1, wherein the stop pin is an L-shaped stop pin and includes a hole at one end for locking into place with a lock, locking bolt, or other locking device.

3. The apparatus of claim 1, wherein when the hollow mounting shafts are inserted in the corresponding hollow mounting shaft sleeves, at least a portion of the hollow mounting shafts are positioned between an outer wall of the bed of the vehicle and the cab of the vehicle.

4. A vehicle rack for mounting on a vehicle having an open bed, comprising:
    a bed mount comprising:
        a mounting plate including a first portion adjacent to an inner wall of the open bed, a second portion adjacent to an outer wall of the open bed which is adjacent to a cab of the vehicle, and a third portion connecting the first and second portions, the third portion including a plurality of holes for attaching the bed mount to a wall of the open bed of the vehicle,
        at least two mounting shaft sleeves attached to the second portion of the mounting plate, each of the at least two mounting shaft sleeves comprising a plurality of holes provided along vertical sides of the at least two hollow mounting shaft sleeves; and
    a box configured to be detachably connected to the bed mount, the box comprising:
        at least two mounting shafts, each configured to be inserted into a corresponding one of the at least two mounting shaft sleeves,
        a plurality of pairs of through holes in the mounting shafts, and
    at least one stop pin configured to be positioned within at least one pair of the plurality of pairs of through holes,
    wherein the first portion and the second portion are parallel to one another and the third portion is perpendicular to both the first portion and the second portion, wherein the two hollow mounting shafts extend lengthwise in a direction perpendicular to the third portion of the mounting plate, and wherein upper surfaces of the at least two hollow mounting shaft sleeves that are parallel to an upper surface of the third portion are at a same level as or at a lower level then the upper surface of the third portion.

5. The vehicle rack of claim 4, wherein the stop pin is an L-shaped stop pin and includes a hole at one end for locking into place with a lock, locking bolt, or other locking device.

6. The vehicle rack of claim 4, wherein the box is a catch box, and wherein the catch box is fitted with a foam insert.

7. The vehicle rack of claim 4, wherein, when the mounting shafts are inserted in the corresponding mounting shaft sleeves, at least a portion of the mounting shafts are between the outer wall of the vehicle bed and the cab of the vehicle.

8. The vehicle rack of claim 4, further comprising:
a plurality of mounting shaft support beams,
wherein a bottommost beam of the plurality of mounting shaft support beams is configured to rest on a top surface of the mounting shaft sleeves when the mounting shafts are inserted in the corresponding hollow mounting shaft sleeves.

9. The vehicle rack of claim 4, wherein the box comprises a catch box, wherein the catch box has an open face to fit materials.

10. The vehicle rack of claim 4, wherein the box comprises a u-shaped support.

11. The apparatus of claim 1,
wherein, for each of the at least two hollow mounting shaft sleeves, a first two vertical sides are parallel to the cab side plate and a second two vertical sides are perpendicular to the cab side plate, and
wherein, for each of the at least two hollow mounting shaft sleeves, the plurality of holes are provided on the second two vertical sides that are perpendicular to the cab side plate.

12. The apparatus of claim 1, wherein the mounting box vertically overlaps the top plate of the u-shaped mounting plate.

13. The apparatus of claim 4,
wherein, for each of the at least two hollow mounting shaft sleeves, a first two vertical sides are parallel to the second portion and a second two vertical sides are perpendicular to the second portion, and
wherein, for each of the at least two hollow mounting shaft sleeves, the plurality of holes are provided on the second two vertical sides that are perpendicular to the second portion.

\* \* \* \* \*